United States Patent [19]

Nagatomo et al.

[11] Patent Number: 5,165,250
[45] Date of Patent: Nov. 24, 1992

[54] AIR CONDITIONING SYSTEM WITH THERMAL STORAGE CYCLE CONTROL

[75] Inventors: Hideaki Nagatomo; Seiji Kubo; Kazuaki Isono; Hidenori Ishioka; Katsuyuki Aoki; Toshihiro Tanaka; Yasuo Imaki; Tomofumi Tezuka; Yoshiaki Tanimura, all of Shizuoka, Japan

[73] Assignee: Mitsubishi Denki Kabushiki Kaisha, Tokyo, Japan

[21] Appl. No.: 677,428

[22] Filed: Mar. 29, 1991

[30] Foreign Application Priority Data

Mar. 30, 1990 [JP] Japan .................................. 2-84444
Jun. 13, 1990 [JP] Japan .................................. 2-154514

[51] Int. Cl.⁵ .......................................... G05D 23/32
[52] U.S. Cl. ......................................... 62/158; 165/18; 237/2 B
[58] Field of Search ................. 165/18; 237/2 B; 126/400, 430, 436; 62/160, 158, 157

[56] References Cited

U.S. PATENT DOCUMENTS

| | | | |
|---|---|---|---|
| 4,761,967 | 8/1988 | Sumikawa et al. | 165/18 |
| 4,798,059 | 1/1989 | Morita | 228/62 |
| 4,850,204 | 7/1989 | Bos et al. | |
| 4,940,079 | 7/1990 | Best et al. | 165/18 |

FOREIGN PATENT DOCUMENTS

| | | |
|---|---|---|
| 0021151 | 1/1981 | European Pat. Off. . |
| 59-208363 | 11/1984 | Japan . |
| 62-87768 | 4/1987 | Japan . |
| 63-21461 | 1/1988 | Japan . |
| 63-135753 | 6/1988 | Japan . |
| 63-273770 | 11/1988 | Japan . |
| 63-306376 | 12/1988 | Japan . |
| 63-306377 | 12/1988 | Japan . |
| 2220256 | 1/1990 | United Kingdom . |

Primary Examiner—John Sollecito
Attorney, Agent, or Firm—Oblon, Spivak, McClelland, Maier & Neustadt

[57] ABSTRACT

An air conditioning system comprising a refrigerant circuit. A thermal storage device is arranged in the refrigerant circuit and can store heat and utilize the stored heat to increase heating capacity at the time of kickoff of heating. A temperature detector detects a temperature at a thermal storage portion of a thermal storage and radiating heat exchanger which is housed in the thermal storage device. A counter counts a thermal storage operation period required for the temperature detected at the thermal storage portion to achieve a predetermined value, outputs a signal indicative of stopping a thermal storage operation when the detected temperature has achieved the predetermined value, counts the lapse of a predetermined thermal storage operation stoppage period after stop of the thermal storage operation, and outputs a signal indicative of starting the thermal storage operation when a predetermined thermal storage operation stoppage time has passed. A controller controls comparing the counted thermal storage operation period with a present value, and determines the next thermal storage operation stoppage period, depending on the length of the counted thermal storage operation period.

5 Claims, 10 Drawing Sheets

|  | TWO WAY MEDIUM PRESSURE SIDE VALVE 12 | THREE WAY VALVE 23 |
|---|---|---|
| HEATING & THERMAL STORAGE OPERATION | CLOSE | TOWARD FOUR WAY REVERSING VALVE |
| HEATING KICKOFF OPERATION | OPEN | TOWARD THERMAL STORAGE RELEASING HEAT EXCHANGER |
| HEATING & DEFROSTING OPERATION | OPEN | TOWARD THERMAL STORAGE RELEASING HEAT EXCHANGER |

$T_0$: RESET TEMPERATURE VALUE (NOT LESS THAN PHASE CHANGE TEMPERATURE OF THERMAL STORAGE MATERIAL $t_0$: INITIAL VALUE FOR THERMAL STORAGE OPERATION INTERRUPTION PERIOD

AIR CONDITIONING SYSTEM WITH THERMAL STORAGE CYCLE CONTROL

BACKGROUND OF THE INVENTION

1. Field of the Invention

The present invention relates to an air conditioning system which can utilize stored heat to improve heating capacity.

2. Discussion of the Background

Referring to FIG. 11, there is shown the refrigerant circuit in a conventional air conditioning system which has been disclosed in e.g. Japanese Unexamined Patent Publication no. 273770/1988. In FIG. 11, reference numeral 1 designates a compressor. Reference numeral 2 designates a four way reversing valve. Reference numeral 3 designates an indoor heat exchanger. Reference numeral 4 designates a first pressure reducing device. Reference numeral 5 designates an outdoor heat exchanger. Reference numeral 6 designates a thermal storage heat exchanger. Reference numeral 7 designates a two way low pressure side valve. Reference numeral 8 designates a thermal storage releasing bypass circuit. Reference numeral 9 designates a low side pressure reducing device. Reference numeral 10 designates a thermal storage releasing heat exchanger. Reference numeral 11 designates a thermal storage bypass circuit. Reference numeral 12 designates a two way medium pressure side valve. Reference numeral 13 designates a thermal storage device. Reference numeral 14 designates a thermal storage material. The thermal storage heat exchanger 6 and the thermal storage releasing heat exchanger 10 are immersed in the thermal storage material 14 and is housed in the thermal storage device 13.

The operation of the refrigerant citcuit will be explained. In a heating and thermal storage operation, the two way medium pressure side valve 12 is closed, and the two way low pressure side valve 7 is opened. A gaseous refrigerant which has high temperature under high pressure and has been discharged from the compressor 1 passes through the four way reversing valve 2, and carries out heat exchange with indoor air at the indoor heat exchanger 3 to perform heating. Due to such heat exchange, the refrigerant becomes a liquid refrigerant having normal temperature under high pressure. The liquid refrigerant is depressurized by the first pressure reducing device 4, and stores heat in the thermal storage material 14 at the thermal storage heat exchanger 6. After that, the refrigerant is evaporated at the outdoor heat exchanger 5 to become a gas. The gaseous refrigerant pathes through the four way reversing valve 2 again, and returns to the compressor 1. At that time, the thermal storage material 14 is melted due to such heat storage.

In a defrosting operation, the two way medium pressure side valve 12 is opened, and the two way low pressure side valve 7 is closed. The gaseous refrigerant which has high temperature under high pressure and has been discharged from the compressor 1 passes though the four way reversing valve 2, and carries out heat exchange with the indoor air at the indoor heat exchanger 3 to partly perform heating. Due to such heat exchanging, the refrigerant becomes a two phase refrigerant having high temperature under high pressure. The two phase refrigerant is depressurized by the first pressure reducing device 4, passes through the thermal storage bypass circuit 11, and reaches the outdoor heat exchanger 5. At the outdoor heat exchanger 5, the refrigerant melts frost which has deposited on the surface of the outdoor heat exchanger 5. Due to such defrosting, the refrigerant becomes a liquid refrigerant having low temperature under medium pressure. The liquid refrigerant pathes through the thermal storage releasing bypass circuit 8, is depressurized by the low side pressure reducing device 9, and withdraws the stored heat from the thermal storage material 14 at the thermal storage releasing heat exchanger 10 to be evaporated and gasified. The refrigerant thus gasified returns to the compressor 1. At that time, the thermal storage material 14 is solidified by passing the stored heat to the refrigerant. This arrangement aims at enabling heating even during defrosting, and preventing an indoor temperature from lowering during defrosting.

In a heating kickoff operation, the two way medium pressure side valve 12 is opened, and the two way low pressure side valve 7 is closed like the heating and defrosting operation. The refrigerant which has high temperature under high pressure and has been discharged from the compressor 1 passes through the four way reversing valve 2, and carries out heat exchange with the indoor air at the indoor heat exchanger 3 to perform heating. Due to such heat exchange, the refrigerant becomes a liquid refrigerant having normal temperature under high pressure The liquid refrigerant is depressurized by the first pressure reducing device 4, and passes through the thermal storage bypass circuit 11. The refrigerant pathes through the outdoor heat exchanger 5 which has minimized the amount of heat exchange, and through the thermal storage releasing bypass circuit 8. Then the refrigerant is depressurized by the low pressure side pressure reducing device 9, and withdraws the stored heat from the thermal storage material 14 at the thermal storage releasing heat exchanger 10 to be evaporated and gasified. The refrigerant thus gasified returns to the compressor 1. At that time, the thermal storage material 14 is solidified by passing the stored heat to the refrigerant. This arrangement aims at offering a heating effect in a rapid and sufficient manner in the heat kickoff operation even if an outdoor temperature is low.

As the conventional air conditioning system is constructed as stated above, in the heating and thermal storage operation there is no difference between the refrigerant pressure in the thermal storage heat exchanger 6 and that in the outdoor heat exchanger 5, resulting in a decrease in refrigerant temperature at the inlet of the thermal storage heat exchanger 6. This creates problems in that the amount of thermal storage can not be obtained in a sufficient manner, and that although the thermal storage material 14 must have a melting point of 0° C. or above for use as defrosting heat source, the presence of a low outdoor temperature makes defrosting impossible because the refrigerant temperature at the inlet of the thermal storage heat exchanger 6 lowers depending on a decrease in the outdoor air temperature. In addition, the arrangement wherein the low pressure side pressure reducing device 9 is arranged between the heat exchanger 5 and the thermal storage releasing heat exchanger 10 causes the refrigerant in the outdoor heat exchanger 5 to have medium pressure and medium temperature in the heating and defrosting operation and the heating kickoff operation, creating a problem in that in the heating and defrosting operation and in the heating kickoff operation a loss due to heat rejection from the outdoor heat exchanger 5 to the outdoor air is increased to lower operating efficiency.

Referring now to FIG. 12, there is shown a conventional heat pump system which has been disclosed in e.g. Japanese Unexamined Patent Publication No. 135753/1988. The system is constructed to have a thermal storage device in a refrigerant citcuit, allowing high heating capacity to be obtained at the kickoff of heating by use of the heat stored in the thermal storage device at night.

In FIG. 12, reference numeral 101 designates a compressor. Reference numeral 102 designates a four way reversing valve. To the four way reversing valve 102 are connected an outdoor heat exchanger 103, an expansion valve 104 as an expansion device, a thermal storage device 105 and an indoor heat exchanger 106 in series. These members constitute a basic heat pump refrigerant citcuit. Between the thermal storage device 105 and the indoor heat exchanger 106 are arranged a first solenoid valve 107 and an expansion valve 108 for kickoff heating in a parallel combination. There are provided a first bypass circuit 109 and a second bypass circuit 110 for bypassing the expansion valve 104, the first bypass circuit 109 having a second solenoid valve 111 and a check valve 112 therein, and the second bypass circuit 110 having a third solenoid valve 113 and a check valve 114 therein.

In the heat pump system having such a structure, when the heat stored in the thermal storage device 105 is utilized to carry out a heating kickoff operation, the operation is made as shown in FIG. 13. Specifically, the first solenoid valve 107 is closed, the second solenoid valve 111 is opened, and only a fan (not shown) for the indoor heat exchanger 106 is driven. The indoor heat exchanger 106 works as condenser, and the thermal storage device 105 functions as evaporator to withdraw the heat stored in the thermal storage device 105. Although the continuation of such operation lowers the temperature in the thermal storage device 105, high heating capacity can be obtained by absorbing heat from outdoor air as long as the evaporating temperature is higher than the temperature of the outdoor air.

When the temperature in the thermal storage device 105 lowers to prevent hiph heating capacity from being obtained, a heating and thermal storage operation starts in the way shown in FIG. 14. This operation is a cycle for storing heat to use in defrosting. In this cycle, the fan for the indoor heat exchanger 106 and a fan (not shown) for the outdoor heat exchanger 103 are driven, and the indoor heat exchanger 106 and the thermal storage device 105 work as condensers, carrying out heating and thermal storage simultaneously.

As the conventional heat pump system has such a structure, when a thermal storage operation has not been made for a long period during no heating operation, the temperature in the thermal storage device lowers, causing a thermal storage material to be solidified. This creates a problem in that when the heating and thermal storage operation starts from such state, it takes much time to increase a diffused air temperature at the time of the heating kickoff operation.

It is an object of the present invention to eliminate these problems, and to provide an air conditioning system capable of using stored heat to carry out a heating and defrosting operation and a heating kickoff operation in a highly effective manner in a way to prevent an outdoor air temperature from having adverse effect on defrosting effectiveness.

It is another object of the present invention to provide an air conditioning system capable of utilizing heat stored in a thermal storage device to blow off conditioned hot air at once at the time of a heating kickoff operation.

According to a first aspect of the present invention, there is provided an air conditioning system comprising a refrigerant circuit which is constituted by connecting a compressor, a four way reversing valve, an indoor heat exchanger, a first pressure reducing device and an outdoor heat exchanger in that order; a thermal storage heat exchanger which is arranged between the first pressure reducing device and the outdoor heat exchanger, and which forms a thermal storage device together with a thermal storage material; a second pressure reducing device arranged between the thermal storage heat exchanger and the outdoor heat exchanger; a thermal storage bypass circuit for bypassing the first pressure reducing device, the thermal storage heat exchanger and the second pressure reducing device, and having a third pressure reducing device and a two way medium pressure side valve therein; a three way valve arranged between the outdoor heat exchanger and the four way reversing valve; and a thermal storage releasing bypass circuit arranged between the three way valve and the compressor to bypass the four way reversing valve, and having a thermal storage releasing heat exchanger, which forms the thermal storage device; wherein at the time of a heating and thermal storage operation a refrigerant is circulated through the compressor, the four way reversing valve, the indoor heat exchanger, the first pressure reducing device, the thermal storage heat exchanger, the second pressure reducing device, the outdoor heat exchanger, the three way valve, the four way reversing valve and the compressor in that order; and wherein at the time of a heating kickoff operation or a heating and defrosting operation the refrigerant is circulated through the compressor, the four way reversing valve, the indoor heat exchanger, the thermal storage bypass circuit, the outdoor heat exchanger, the three way valve, the thermal storage releasing bypass circuit and the compressor in that order.

According to a second aspect of the present invention, there is provided an air conditioning system comprising a refrigerant circuit which is constituted by connecting a compressor, a four way reversing valve, an indoor heat exchanger, a first pressure reducing device and an outdoor heat exchanger in that order; a thermal storage heat exchanger which is arranged between the first pressure reducing device and the outdoor heat exchanger, and which forms a thermal storage device together with a thermal storage material; a second pressure reducing device arranged between the thermal storage heat exchanger and the outdoor heat exchanger; a thermal storage bypass circuit for bypassing the first pressure reducing device and the thermal storage heat exchanger, and having a two way medium pressure side valve therein; a three way valve arranged between the outdoor heat exchanger and the four way reversing valve; and a thermal storage releasing bypass circuit arranged between the three way valve and the compressor to bypass the four way reversing valve, and having a thermal storage releasing heat exchanger, which forms the thermal storage device; wherein at the time of a heating and thermal storage operation a refrigerant is circulated through the compressor, the four way reversing valve, the indoor heat exchanger, the first pressure reducing device, the thermal storage heat exchanger, the second pressure reducing device, the outdoor heat exchanger, the three way valve, the four way reversing valve and the compressor in that order; and wherein at the time of a heating kickoff operation or a heating and defrosting operation the refrigerant is circulated through the compressor, the four way reversing valve, the indoor heat exchanger, the thermal storage bypass circuit, the second pressure reducing device, the outdoor heat exchanger, the three way valve, the thermal storage releasing bypass circuit and the compressor in that order.

According to a third aspect of the present invention, there is provided air conditioning system comprising a refrigerant circuit which is constituted by connecting a compressor, a four way reversing valve, an indoor heat exchanger, a first pressure reducing device and an outdoor heat exchanger in that order; a thermal storage heat exchanger which is arranged between the first pressure reducing device and the outdoor heat exchanger, and which forms a thermal storage device together with a thermal storage material; a second pressure reducing device arranged between the thermal storage heat exchanger and the outdoor heat exchanger; a thermal storage bypass circuit for bypassing the first pressure reducing device, and having a two way medium pressure side valve therein; a three way valve arranged between the outdoor heat exchanger and the four way reversing valve; and a thermal storage releasing bypass circuit arranged between the three way valve and the compressor to bypass the four way reversing valve, and having a thermal storage releasing heat exchanger, which forms the thermal storage device; wherein at the time of a heating and thermal storage operation a refrigerant is circulated through the compressor, the four way reversing valve, the indoor heat exchanger, the first pressure reducing device, the thermal storage heat exchanger, the second pressure reducing device, the outdoor heat exchanger, the three way valve, the four way reversing valve and the compressor in that order; and wherein at the time of a heating kickoff operation or a heating and defrosting operation the refrigerant is circulated through the compressor, the four way reversing valve, the indoor heat exchanger, the thermal storage bypass circuit, the thermal storage heat exchanger, the second pressure reducing device, the outdoor heat exchanger, the three way valve, the thermal storage releasing bypass circuit and the compressor in that order.

According to a fourth aspect of the present invention, there is provided an air conditioning system comprising a refrigerant circuit; a thermal storage device which is arranged in the refrigerant circuit, and which can store heat and utilize the stored heat to increase heating capacity at the time of kickoff of heating; temperature detecting means for detecting a temperature at a thermal storage portion of a thermal storage and radiating heat exchanger which is housed in the thermal storage device; means for counting a thermal storage operation period required for the temperature detected at the thermal storage portion to achieve a predetermined value, for outputting a signal indicative of stopping a thermal storage operation when the detected temperature has achieved the predetermined value, for counting the lapse of a predetermined thermal storage operation stoppage period after stop of the thermal storage operation, and for outputting a signal indicative of starting the thermal storage operation when the predetermined thermal storage operation stoppage time has passed; and control means for comparing the counted thermal storage operation period with a preset value, and determining the next thermal storage operation stoppage period, depending on the length of the counted thermal storage operation period.

In the fourth aspect, it is preferable that the temperature detected at the thermal storage portion is a pipe temperature at a thermal storage side of the thermal storage and radiating heat exchanger.

In the fourth aspect, the preset value can be changed, depending on an operating condition. In the fourth aspect, the operating condition may be an outdoor air temperature. In the fourth aspect, the operating condition may be a driving condition of the compressor.

DESCRIPTION OF THE PREFERRED EMBODIMENTS

Preferred embodiments of the present invention will be described with reference to the drawings.

Figures 1, 2:
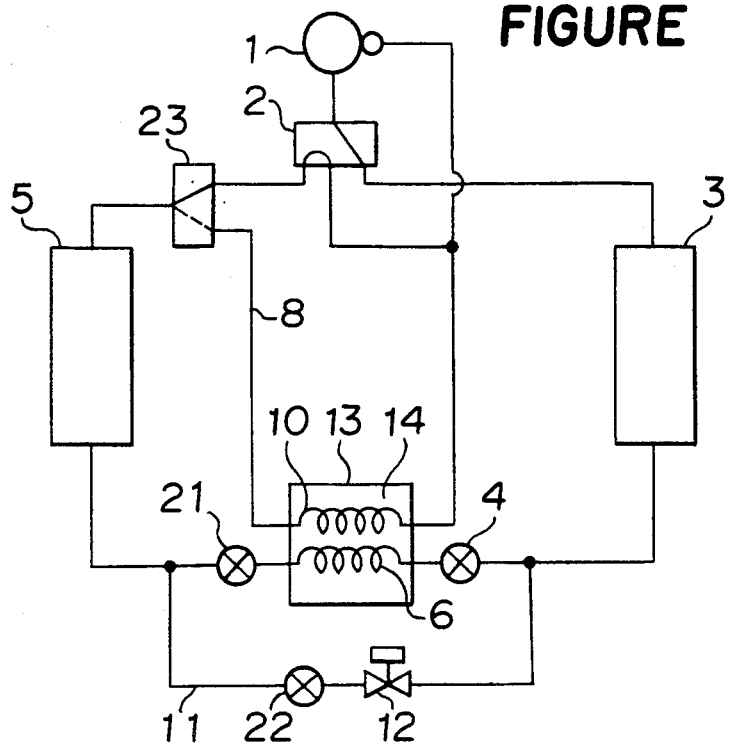
FIG. 1 is a schematic diagram showing a first embodiment of the refrigerant circuit of the present invention.
FIG. 2 is a table showing the switching positions of the two way medium pressure side valve and the three way valve in the first embodiment.
Figure 11:
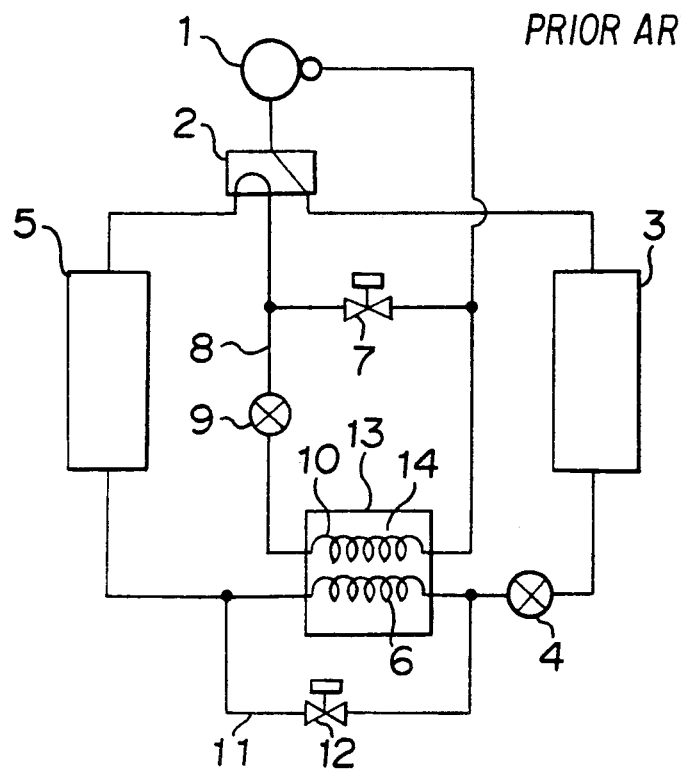
FIG. 11 is a schematic diagram showing the refrigerant circuit of a conventional air conditioning system.
Figure 12:
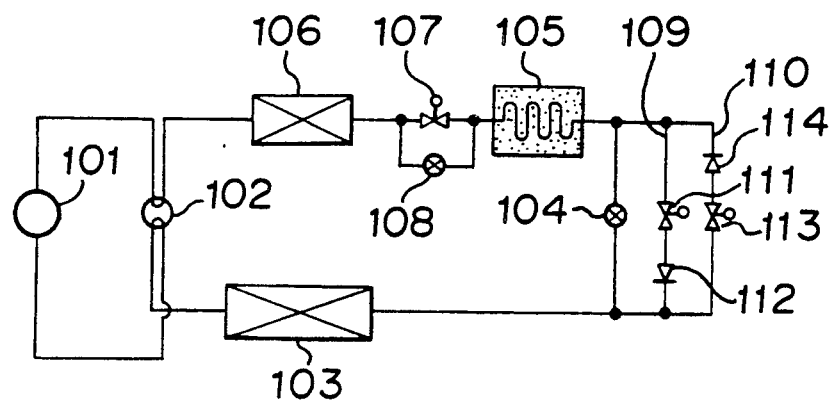
FIG. 12 is a schematic diagram showing the refrigerant circuit of a conventional heat pump system.
Figure 13:
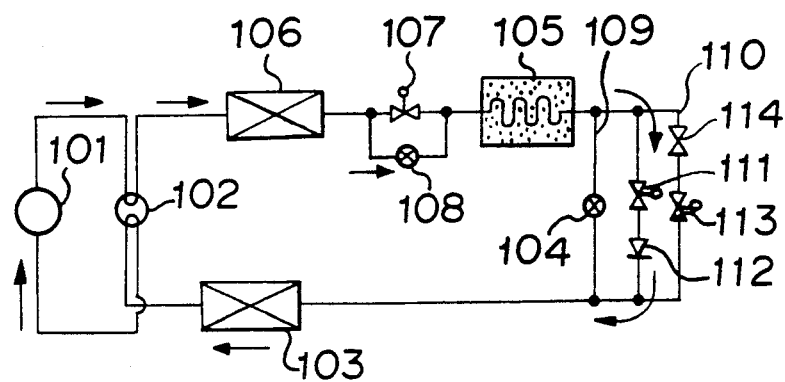
FIG. 13 is a schematic diagram showing the operation of the conventional heat pump system in a heating kickoff operatoin.
Figure 14:
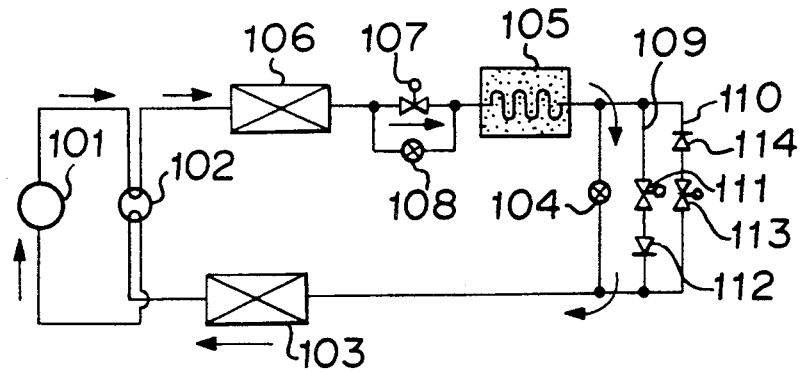
FIG. 14 is a schematic diagram showing the operation of the conventional heat pump system in a heating and thermal storage operation.

A first embodiment of the present invention will be explained, referring to FIGS. 1 and 2, FIG. 1 being a schematic diagram of the refrigerant circuit according to the first embodiment, and FIG. 2 being a table showing the valve switching positions thereof. In FIG. 1, reference numerals 1 through 14 indicated parts which are similar to those of the conventional air conditioning system of FIG. 11. Explanation of these parts will be omitted for the sake of simplicity. Reference numeral 21 designates a second pressure reducing device which is arranged in the refrigerant circuit between the thermal storage heat exchanger 6 and the outdoor heat exchanger 5. Reference numeral 22 designates a third pressure reducing device which is arranged in the thermal storage bypass circuit 11 between the two way medium pressure side valve 12 and the outdoor heat exchanger 5. Reference numeral 23 designates a three way valve which is arranged in the refrigerant circuit between the outdoor heat exchanger 5 and the four way reversing valve 2, and which can select whether to direct a refrigerant to the compressor 1 through the thermal storage releasing heat exchanger 10 or not.

The operation of the first embodiment will be explained. In a heating and thermal storage operation, the two way medium pressure side valve 12 is closed, and the three way valve 23 is switched in a way to direct the refrigerant toward the four way reversing valve 2 as shown in the table of FIG. 2. The refrigerant which has been discharged from the compressor 1 as gas having high temperature under high pressure passes through the four way reversing valve 2, and carries out heat exchange with indoor air at the indoor heat exchanger 3 to carry out heating. Due to such heat exchange, the refrigerant becomes a liquid having normal temperature under high pressure. The liquid refrigerant is depressurized to medium pressure by the first pressure reducing device 4, and stores heat in the thermal storage material 14 at the thermal storage heat exchanger 6. Then the refrigerant is depressurized to low pressure by the second pressure reducing device 21, and is evaporated to be gasified in the outdoor heat exchanger 5. The refrigerant thus gasified passes through the three way valve 23 and the four way reversing valve 2, and returns to the compressor 1. In this operation the thermal storage material 14 is melted due to such thermal storage.

In a defrosting operation, the two way medium pressure side valve 12 is opened, and the three way valve 23 is switched to direct the refrigerant toward the thermal storage releasing heat exchanger 10 as shown in the table of FIG. 2. The refrigerant which has been discharged from the compressor 1 as gas having high temperature under high pressure passes through the four way reversing valve 2, and carries out heat exchange with the indoor air at the indoor heat exchanger 3 to partly perform heating. Due to such heat exchange, the refrigerant becomes a two phase refrigerant having high temperature under high pressure. The refrigerant enters the thermal storage bypass circuit 11, and is depressurized by the third pressure reducing device 22. Then the refrigerant reaches the outdoor heat exchanger 5, and melts the frost which has deposited on the surface of the outdoor heat exchanger 5. Due to such defrosting, the refrigerant becomes a liquid refrigerant having low temperature under medium pressure. The liquid refrigerant pathes through the three way valve 23 and the thermal storage releasing bypass circuit 8, and withdraws the heat stored in the thermal storage material 14 at the thermal storage releasing heat exchanger 10 to be evaporated and gasified. The refrigerant thus gasified returns to the compressor 1. In this operation, the thermal storage material 14 is solidified by passing the stored heat to the refrigerant.

In a heating kickoff operation, the two way medium pressure side valve 12 is opened, and three way valve 23 is switched in a way to direct the refrigerant toward the thermal storage releasing heat exchanger 10 like the heating and defrosting operation. The refrigerant which has been discharged from the compressor 1 as gas having high temperature under high pressure passes through the four way reversing valve 2, and carries out heat exchange with the indoor air at the indoor heat exchanger 3 to perform heating. Due to such heat exchange, the refrigerant becomes a liquid refrigerant having high temperature under high pressure. The liquid refrigerant enters the thermal storage bypass circuit 11, and is depressurized by the third pressure reducing device 22. Then the refrigerant pathes through the outdoor heat exchanger 5 which has minimized the amount of heat exchange. The refrigerant pathes through the three way valve 23 and the thermal storage releasing bypass circuit 8, and withdraws the heat stored in the thermal storage material 14 at the thermal storage releasing heat exchanger 10 to be evaporated and gasified. The refrigerant thus gasified returns to the compressor 1. In this operation, the thermal storage material 14 is solidified by passing the stored heat to the refrigerant.

As explained, in the heating and thermal storage operation, the second pressure reducing device 21 ensures a suitable difference between the refrigerant pressure in the thermal storage heat exchanger 6 and that in the outdoor heat exchanger 5, and carries out such control that the refrigerant temperature at the inlet of the thermal storage heat exchanger 6 is not less than the melting point of the thermal storage material 14. This arrangement can not only obtain the amount of thermal storage in a sufficient manner, irrespectively of an outdoor air temperature, but can also carry out defrosting even if the outdoor air temperature is low. Selection of the thermal storage material 14 is facilitated.

On the other hand, in the heating and defrosting operation and the heating kickoff operation, a decrease in pressure loss between the outdoor heat exchanger 5 and the thermal storage releasing heat exchanger 10 causes the refrigerant temperature in the outdoor heat exchanger 5 to lower, thereby minimizing a loss due to heat rejection from the outdoor exchanger to the outdoor air. The provision of the third pressure reducing device 22 can keep the inside of the indoor heat exchanger 3 at high temperature under high pressure to exhibit heating capacity in a sufficient manner.

Figure 3:
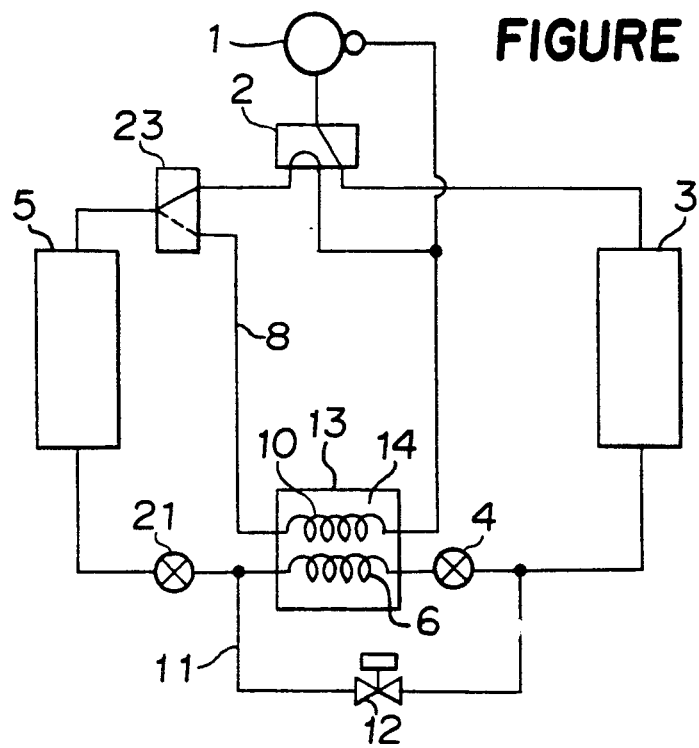
FIG. 3 is a schematic diagram showing a second embodiment of the refrigerant circuit of the present invention.

A second embodiment of the present invention will be explained, referring to FIG. 3 which is a schematic diagram showing the refrigerant circuit according to the second embodiment. The second embodiment is different from the first embodiment in that the thermal storage bypass circuit 11 bypasses only the first pressure reducing device 4 and the thermal storage heat exchanger 6, and that the thermal storage bypass circuit has only the two way medium pressure side valve 12 therein. In the second embodiment, a heating and thermal storage operation is carried out like in the first embodiment.

In a defrosting operation, the two way medium pressure side valve 12 is opened, and the three way valve 23 is switched to direct the refrigerant toward the thermal storage releasing heat exchanger 10. The refrigerant which has been discharged from the compressor 1 as gas having high temperature under high pressure passes through the four way reversing valve 2, and carries out heat exchange with the indoor air at the indoor heat exchanger 3 to partly perform heating. Due to such heat exchange, the refrigerant becomes a two phase refrigerant having high temperature under high pressure. Then the refrigerant pathes through the thermal storage bypass circuit 11, and is depressurized by the second pressure reducing device 21. The refrigerant thus depressurized reaches the outdoor heat exchanger 5, and melts the frost which has deposited on the surface of the outdoor heat exchanger 5. Due to such defrosting, the refrigerant becomes a liquid having low temperature under medium pressure. The liquid refrigerant enters the thermal storage releasing bypass circuit 8 through the three way valve 23, and withdraws the heat stored in the thermal storage material 14 at the thermal storage releasing heat exchanger 10 to be evaporated and gasified. The refrigerant thus gasified returns to the compressor 1. In this operation, the thermal storage material 14 is solidified by passing the stored heat to the refrigerant.

In a heating kickoff operation, the two way medium pressure side valve 12 is opened, and the three way valve 23 is switched to direct the refrigerant toward the thermal storage releasing heat exchanger 10 like in the heating and defrosting operation. The refrigerant which has been discharged from the compressor 1 as gas having high temperature under high pressure passes through the four way reversing valve 2, and carries out heat exchange with the indoor air at the indoor heat exchanger 3 to carry out heating. Due to such heat exchange, the refrigerant becomes a liquid having high temperature under high pressure. The liquid refrigerant pathes through the thermal storage bypass circuit 11, is depressurized by the second pressure reducing device 21, and passes through the outdoor heat exchanger 5 which has minimized the amount of heat exchange. Then the refrigerant enters the thermal storage releasing bypass circuit 8 through the three way valve 23, and withdraws the stored heat from the thermal storage material 14 at the thermal storage releasing heat exchanger 10 to be evaporated and gasified. The refrigerant thus gasified returns to the compressor 1. In that operation, the thermal storage 14 is solidified by passing the stored heat to the refrigerant.

Although the second embodiment has been explained for the case wherein the three way valve is utilized to ensure switching the flow of the refrigerant, the provision of the three way valve 23 may be replaced by the provision of a first two way low pressure side valve between the outdoor heat exchanger 5 and the four way reversing valve 2, and a second two way low pressure side valve between the outdoor heat exchanger 5 and the thermal storage releasing heat exchanger 10.

In accordance with the air conditioning system of the first embodiment, the second pressure reducing device is activated to control the refrigerant temperature at the inlet of the thermal storage heat exchanger in a proper manner in the heating and thermal storage operation. In the heating and defrosting operation and the heating kickoff operation, the pressure loss between the outdoor heat exchanger and the thermal storage releasing heat exchanger is decreased to reduce the loss due to heat rejection from the outdoor heat exchanger to the outdoor air. In addition, the third pressure reducing device is activated to keep the inside of the indoor heat exchanger at high temperature under high pressure, obtaining a heating effect in a sufficient manner.

In accordance with the air conditioning system of the second embodiment, the second pressure reducing device is activated to control the refrigerant temperature at the inlet of the thermal storage heat exchanger in a proper manner in the heating and thermal storage operation. In the heating and defrosting operation and the heating kickoff operation, the pressure loss between the outdoor heat exchanger and the thermal storage releasing heat exchanger is decreased to reduce the loss due to heat rejection from the outdoor heat exchanger. In addition, the second pressure reducing device is activated to keep the inside of the indoor heat exchanger at high temperature under high pressure, obtaining a heating effect in a sufficient manner.

The arrangement of the air conditioning system according to the first embodiment can obtain a suitable difference between the pressure in the thermal storage heat exchanger and that in the outdoor heat exchanger by the second pressure reducing device in the heating and thermal storage operation, and carries out such control that the refrigerant temperature at the inlet of the thermal storage heat exchanger is not less than the melting point of the thermal storage material. As a result, the amount of thermal storage can be obtained in a sufficient manner, irrespectively of outdoor air temperature, and defrosting is possible even when the outdoor air temperature is low. In addition, in the heating and defrosting operation and the heating kickoff operation, the pressure loss between the outdoor heat exchanger and the thermal storage releasing heat exchanger is decreased to reduce the loss due to heat rejection from the outdoor heat exchanger to the outdoor air. The third pressure reducing device is activated to keep the inside of the indoor heat exchanger at high temperature under high pressure, obtaining a heating effect in a sufficient manner.

The arrangement of the air conditioning system according to the second embodiment offers advantages similar to the first embodiment. In addition, the second embodiment dispenses with the provision of the third pressure reducing device, simplifying the structure of the system.

Figure 4:
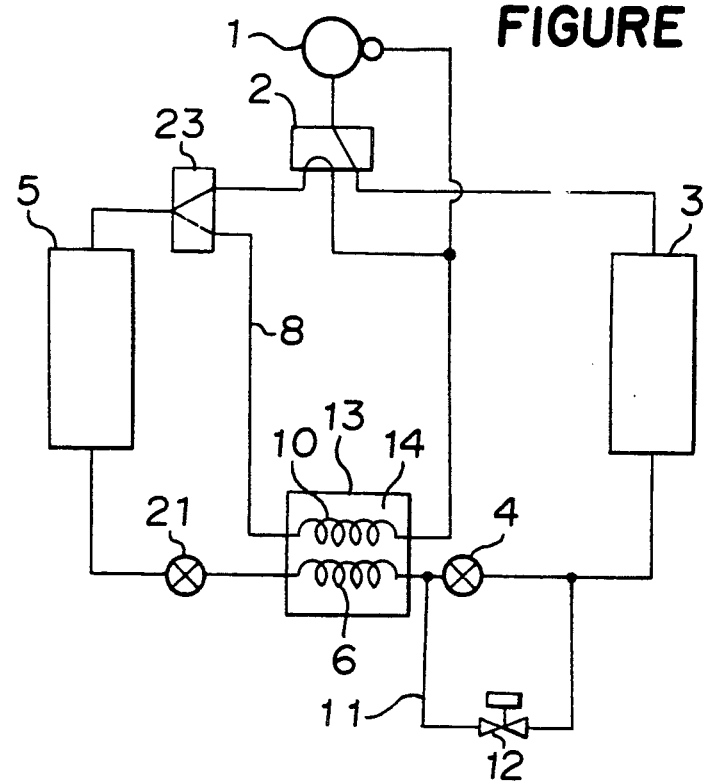
FIG. 4 is a schematic diagram showing a third embodiment of the refrigerant circuit of the present invention.

Although in the second embodiment the thermal storage bypass circuit 11 is arranged to bypass the first pressure reducing device 4 and the thermal storage heat exchanger 6, the thermal storage bypass circuit 11 can be arranged to bypass only the first pressure reducing device 4 as shown as a third embodiment in FIG. 4, offering similar advantages. The arrangement of the third embodiment wherein only the first pressure reducing device is bypassed allows defrosting to be carried out while partly performing thermal storage, thereby lengthening the time to spent the stored heat.

Now, a fourth embodiment of the present invention will be explained, referring to FIGS. 5 through 11.

Figure 5:
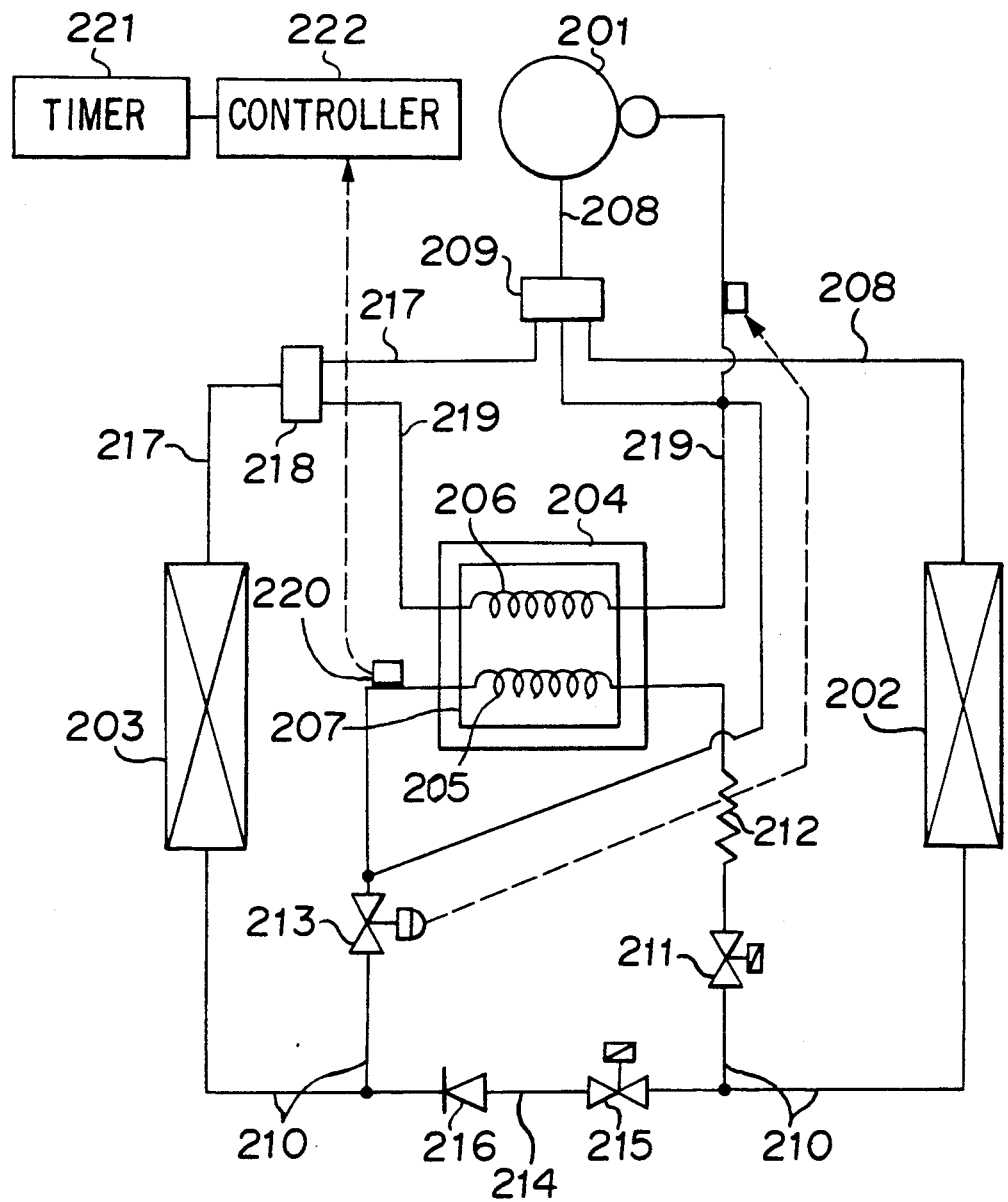
FIG. 5 is a schematic diagram showing a fourth embodiment of the refrigerant circuit of the air conditioning system according to the present invention.

In FIG. 5, reference numeral 201 designates a compressor. Reference numeral 202 designates an indoor heat exchanger. Reference numeral 203 designates an outdoor heat exchanger. Reference numeral 204 designates a thermal storage device. The thermal storage device 204 has such a structure that a thermal storage and radiating heat exchanger 207 with a first refrigerant path 205 and a second refrigerant path 206 in it is housed and a latent heat type of thermal storage material is filled.

Reference numeral 208 designates a first connecting pipe which connects between the compressor 201 and the indoor heat exchanger 202. Reference numeral 209 designates a four way reversing valve which is arranged in the first connecting pipe 208. Reference numeral 210 designates a second connecting pipe which connects between the indoor heat exchanger 202 and the outdoor heat exchanger 203, and in which a first on-off valve 211, a first flow controller (e.g. a capillary tube) 212, the first refrigerant path 205 and a second flow controller (e.g. a thermostatic refrigerant expansion valve) 213 are connected from the side of the indoor heat exchanger 202 in that order.

Reference numeral 214 designates a first bypass pipe which is connected to the second connecting pipe in a way to bypass the first on-off valve 211, the first flow controller 212, the first refrigerant path 205 and the second flow controller 213, and in which a second on-off valve 215 and a check valve 216 are arranged from the side of the indoor heat exchanger 202 in that order.

Reference numeral 217 designates a third connecting pipe which connects between the outdoor heat exchanger 203 and the four way reversing valve 209, and in which a three way valve (channel switching device) 218 is arranged. Reference numeral 219 designates a second bypass pipe which connects between the three way valve 218 and the compressor 201 in a way to bypass the four way reversing valve 209, and in which the second refrigerant path 206 is arranged.

Reference numeral 220 designates a temperature sensor which is arranged on the first refrigerant path 205 as a thermal storage side pipe of the thermal storage and radiating heat exchanger 207, and which detects the temperature of the thermal storage side pipe and outputs the detected temperature to a controller which will be explained later on.

Reference numeral 221 designates a timer. The timer 221 not only counts a thermal storage operation period required for the thermal storage side pipe temperature to achieve a predetermined value to output a signal indicative of stopping the thermal storage operation, but also counts the lapse of a predetermined thermal storage operation interruption period after stop of the thermal storage operation to output a signal indicative of starting the thermal storage operation.

Reference numeral 222 designates the controller which compares the counted thermal storage operating period with a preset value based on outputs from the temperature sensor 220 and the timer 221, and which determines the next thermal storage operation interruption period (timing for restarting the thermal storage operation), depending on the length of the counted thermal storage operation period.

The operation of the fourth embodiment will be explained.

Figure 6:
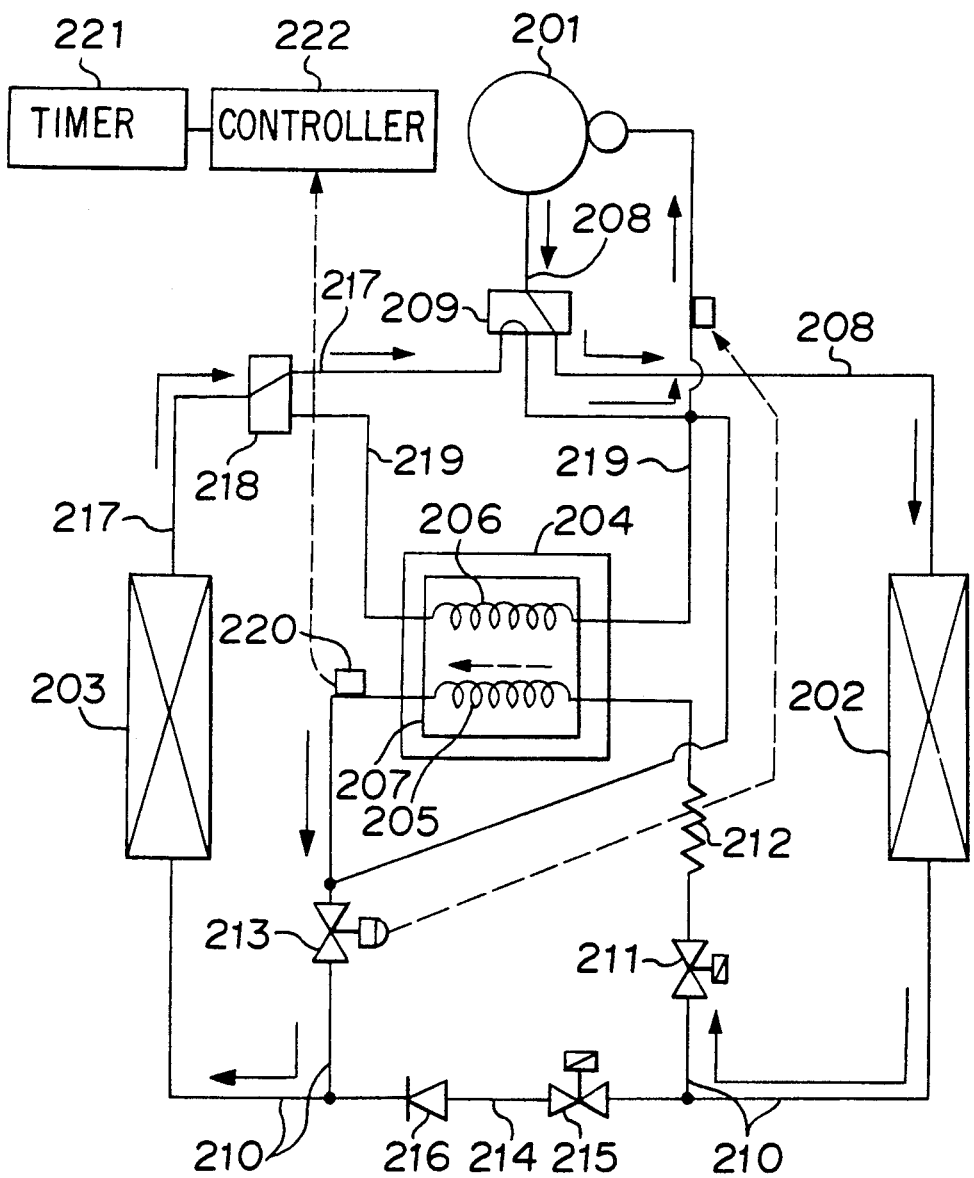
FIG. 6 is a schematic diagram showing the refrigerant circuit at a thermal storage operation in the heat pump device.

Firstly, the thermal storage operation will be described, referring to the refrigerant circuit of FIG. 6. The refrigerant flows as indicated by the arrows. The first on-off valve 211 is opened, and the second on-off valve 215 is closed. The three way valve 218 is switched in a way to direct a refrigerant from the outdoor heat exchanger 203 to the four way reversing valve 209. The refrigerant which has been discharged from the compressor 201 as gas having high temperature under high pressure passes through the indoor heat exchanger 202 with almost no heat exchange therein. The first flow controller 212 slightly liquefies and condenses the refrigerant, and depressurizes the refrigerant from high pressure to medium pressure. Then the refrigerant enters the first refrigerant path 205 of the thermal storage device 204, and carries out heat exchange (liquefaction and condensation) to store heat into the thermal storage material. In this operation, the medium pressure is set so that the saturation temperature under that pressure is higher than the phase change temperature of the thermal storage material.

The refrigerant which is under such medium pressure is depressurized to low pressure by the second low controller 213, carries out heat exchange with outdoor air at the outdoor heat exchanger 203 to be gasified, and is inspired into the compressor 201. The refrigerant is circulated in that manner to store heat into the thermal storage material in the thermal storage device 204.

The control for the thermal storage operation will be explained, referring to FIG. 7.

During the thermal storage operation, the temperature sensor 220 detects a thermal storage side pipe temperature T at the thermal storage and radiating heat exchanger 207 (Step 1). It is determined whether the pipe temperature T has achieved a preset value $T_0$ that is not less than the phase change temperature of the thermal storage material (for example, 30° C. for a hexadecane storage material having a phase change temperature of 17° C.) or not (Step 2). If affirmative, the thermal storage operation is stopped, and simultaneously the timer 221 is started to count a thermal storage operation stoppage period (thermal storage operation interruption period) t (Step 3). It is determined whether a preset initial period $t_0$ (e.g. a thermal storage interruption period of 60 minutes) has passed or not (Step 4). If affirmative, the thermal storage operation is restarted, and simultaneously the timer 221 is started to count a thermal storage operation period t' (Step 5). During the restarting thermal storage operation, the temperature sensor 220 detects the thermal storage side pipe temperature T of the thermal storage and radiating heat exchanger 207 (Step 6). It is determined whether the pipe temperature T has achieved the preset temperature value $T_0$ or not (Step 7). If affirmative, the thermal storage operation is stopped, and simultaneously the thermal storage operation period counting timer is also stopped (Step 8).

In the description, the pipe temperature is represented by absolute value. The thermal storage material has an inherent melting point. When the pipe temperature has achieved the melting point of the thermal storage material or above, it can be considered that the thermal storage has been completed.

It is determined whether the counted thermal storage operation period t' is compared to a preset value $t_M$ (Step 9). If the counted thermal storage operation period t' is not shorter than the preset value $t_M$, the next thermal storage operation interruption period $t_0$ is shortened because a low outdoor air temperature causes much heat dissipation loss. Specifically, the value of $t_0$ is replaced by a value of $t_0 - \alpha$ ($\alpha$ is a preset period, e.g. 10 minutes) (Step 10). Conversely, if the counted thermal storage operation period t' is shorter than the preset value $t_M$ (Step 9), the next thermal storage interruption period $t_0$ is lengthened because a high outdoor air temperature causes less heat dissipation loss. Specifically the value of $t_0$ is replaced by a value $t_0 + \alpha$ (Step 11). The thermal storage operation is carried out in that manner to be making preparations for the next heating operation while maintaining a thermal storage state.

Figure 7:
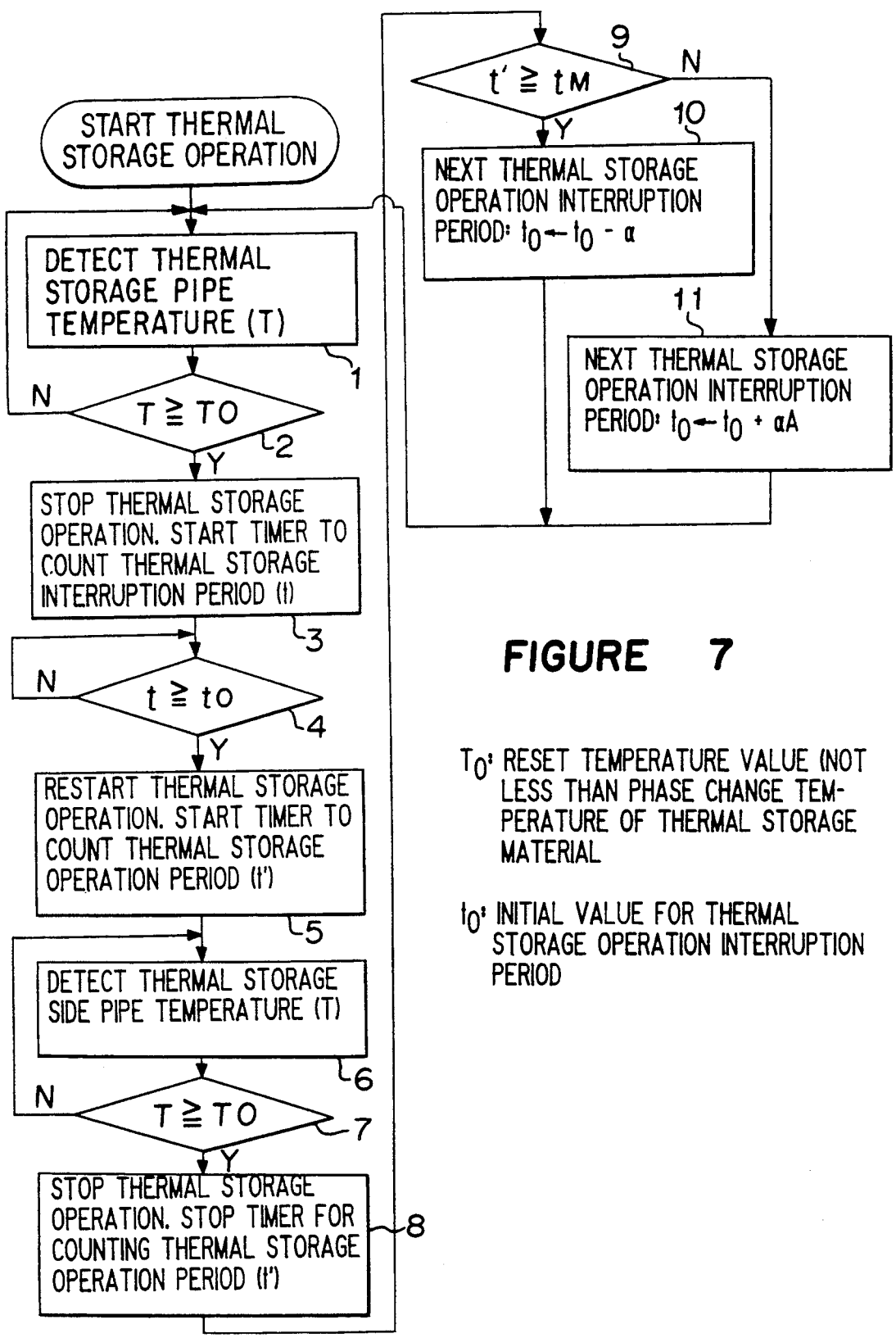
FIG. 7 is a flow chart showing the controls which are made at the thermal storage operation.

The preset value $t_M$ in the flow chart of FIG. 7 may be modified, depending on an outdoor air temperature, in e.g. a way to be in proportion to a detected outdoor temperature. The preset value $t_M$ may be also modified, depending on a driving condition of the compressor. The driving condition can be detected based on a driving current to the compressor or a discharge pressure of the refrigerant from the compressor.

Figure 8:
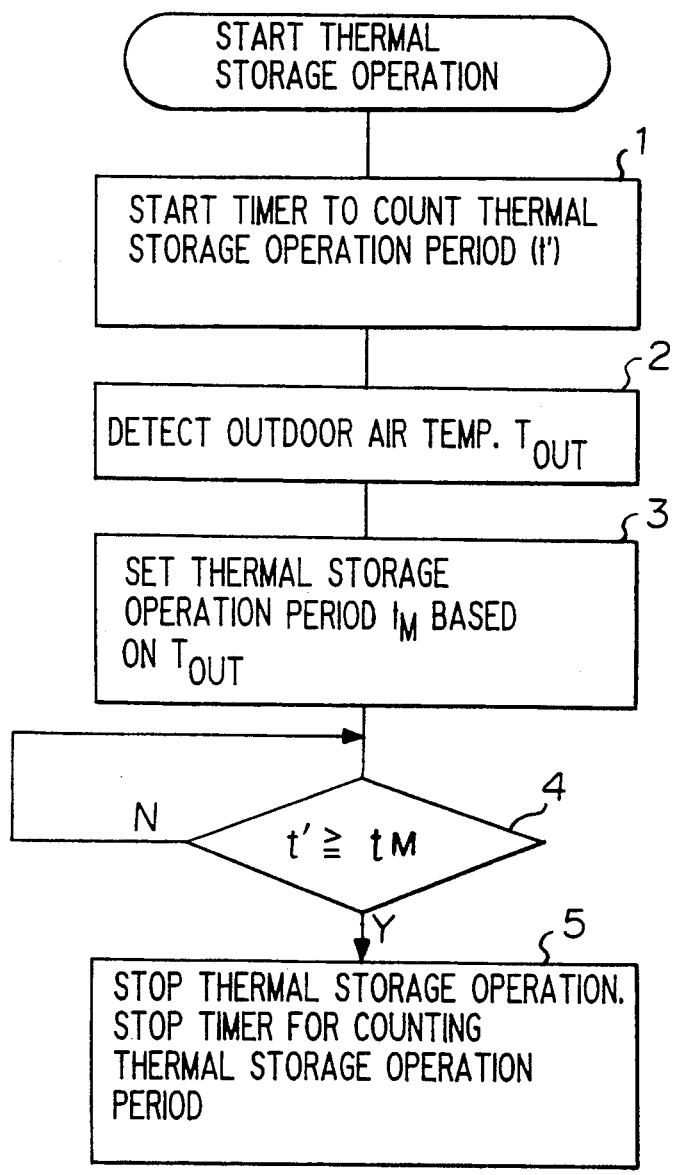
FIG. 8 is a flow chart showing the controls which are made to modify a preset thermal storage operation period based on an outdoor air temperature.
Figure 9:
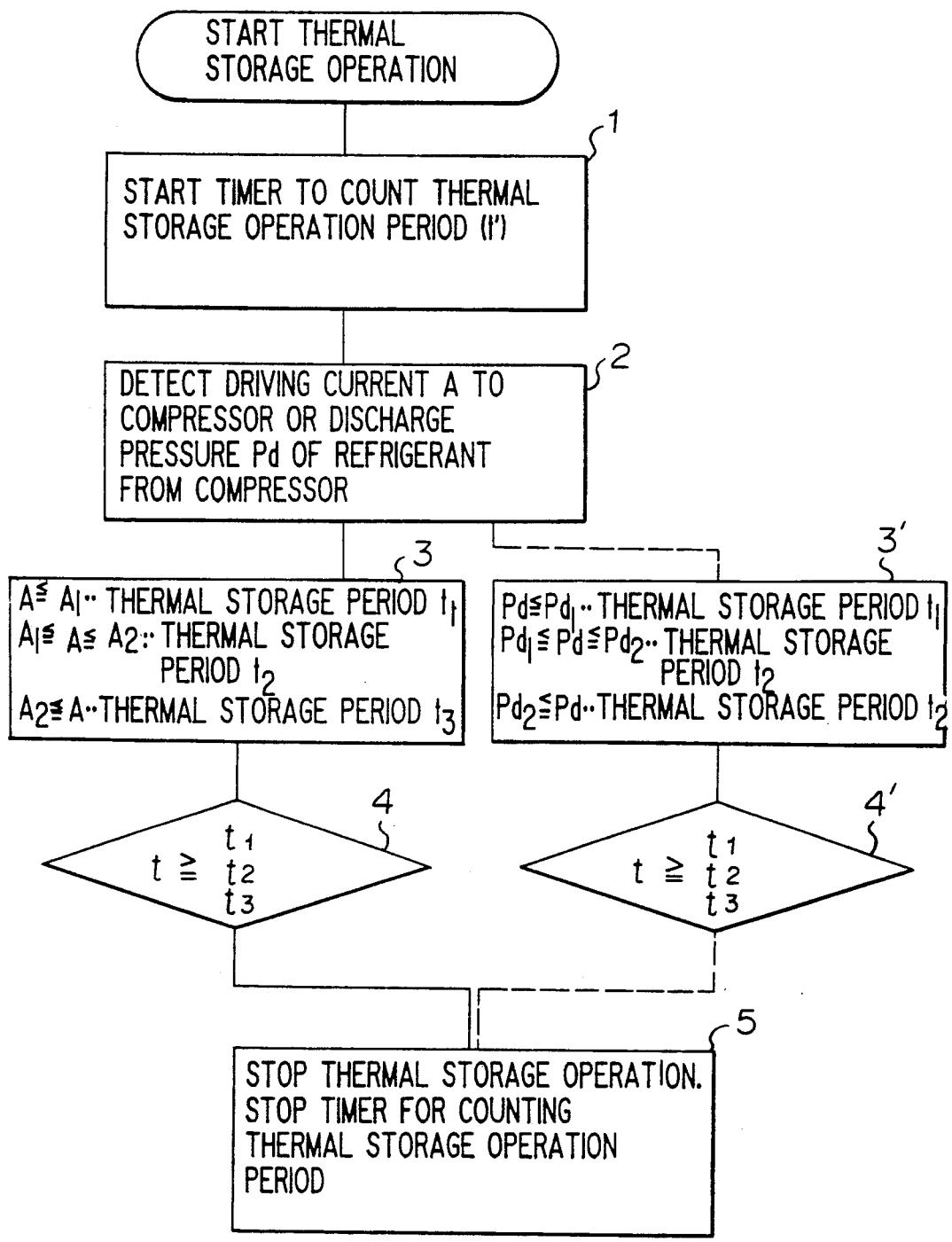
FIG. 9 is a flow chart showing the controls which are made to modify the thermal storage operation period based on a compressor driving current or a compressor discharge pressure.

The thermal storage operation control may be carried out as shown in the flow charts of FIGS. 8 and 9.

In FIG. 8, there is shown that a target thermal storage operation period $t_M$ is set to be in proportion to a detected outdoor air temperature $T_{out}$. When the thermal storage operation starts, the timer starts to count the thermal storage operation period t at Step 1. The outdoor air temperature $T_{out}$ is detected at Step 2. The target thermal storage operation period $t_M$ is set to be in proportion to the detected outdoor air temperature $T_{out}$ at Step 3. At Step 4, it is determined whether the counted thermal storage operation period t has achieved the target thermal storage operation period $t_M$ or not. If affirmative, the thermal storage operation is stopped, and the timer ceases to count.

In FIG. 9, there is shown that a target thermal storage operation period $t_M$ is set, depending on a driving condition of the compressor. The driving condition can be detected based on a driving current A to the compressor or a discharge pressure Pd of the refrigerant from the compressor.

The control of FIG. 9 is different from that of FIG. 8 in that instead of the outdoor air temperature, the driving current A or the discharge pressure Pd is detected at Step 2, and that the target thermal storage operation period $t_1$, $t_2$ or $t_3$ is chosen according to a predetermined table at Step 3 or 3'. At step 4 or 4', it is determined whether the counted thermal storage operation period t has achieved the chosen target thermal storage operation period $t_1$, $t_2$ or $t_3$ or not (wherein $t_1 > t_2 > t_3$).

The controls of FIGS. 8 and 9 can be carried out before or after the control of FIG. 7.

Figure 10:
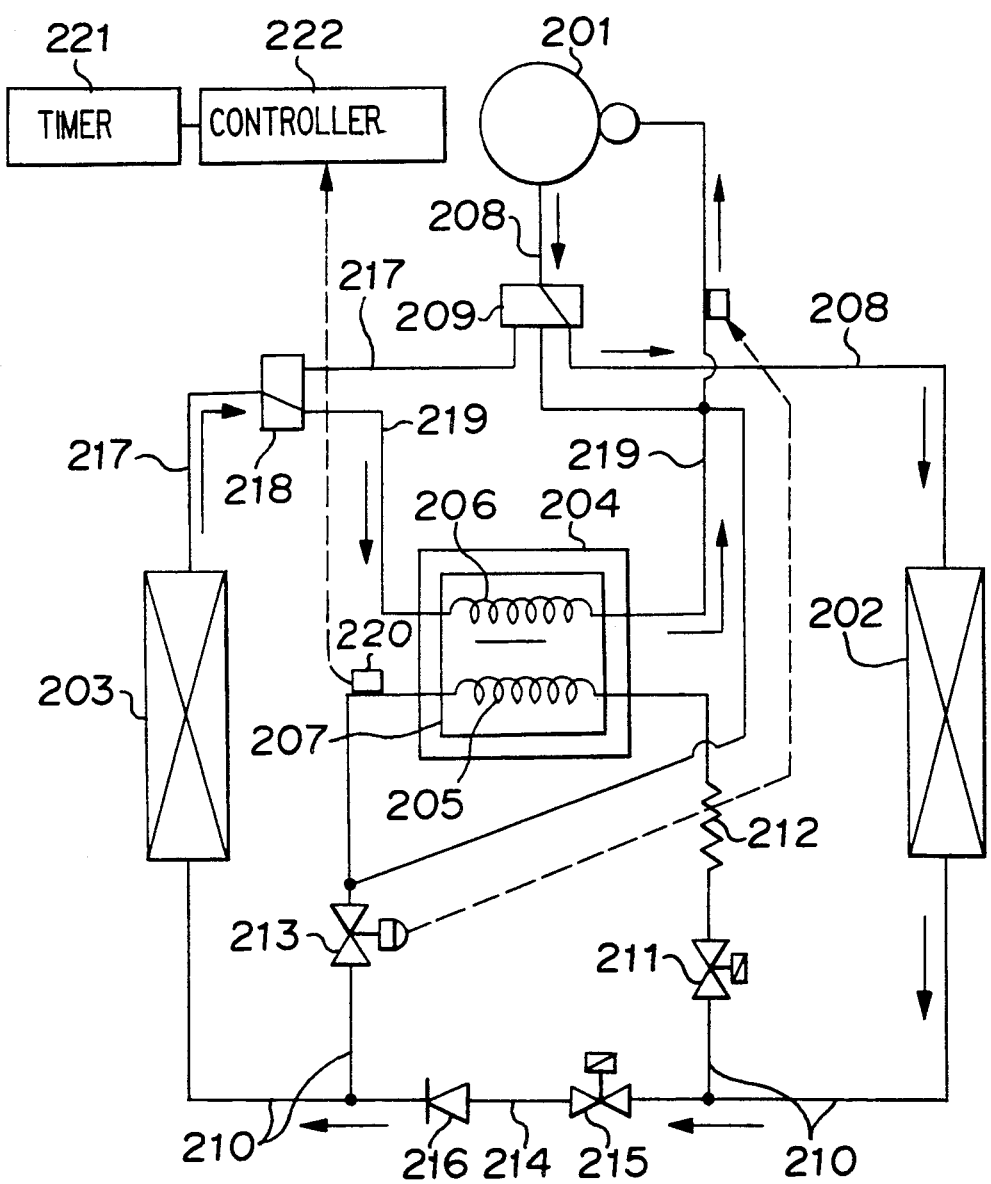
FIG. 10 is a schematic diagram showing the refrigerant circuit in a heating kickoff operation in accordance with the fourth embodiment.

Now, a heating kickoff operation will be explained, referring to FIG. 10.

In the heating kickoff operation, the refrigerant flows as indicated by the arrows. The second on-off valve 215 is opened, and the first on-off valve 211 is closed. The three way valve 218 is switched to communicate the outdoor heat exchanger 203 to the second bypass pipe 219.

The refrigerant which has been discharged from the compressor 201 as gas having high temperature under high pressure is directed into the indoor heat exchanger 202, and carries out heat exchange with the indoor air there to carry out heating, being condensed and liquefied. The refrigerant thus liquefied is directed to the first bypass pipe 214, is depressurized on passing through the second on-off valve 215 and the check valve 216. The refrigerant thus depressurized passes through the outdoor heat exchanger 203 with almost no heat exchange there. Then the refrigerant enters the second refrigerant path 206 in the thermal storage device 204, carries out heat exchange with the thermal storage material in the thermal storage device 204 to be evaporated and gasified, and is inspired into the compressor 201.

In accordance with the air conditioning system of the fourth embodiment, when the pipe temperature detected by the temperature detecting means has achieved the preset temperature value (not less than the thermal storage material phase change temperature), the thermal storage operation is stopped and the counting means counts the lapse of a period after stoppage of the thermal storage operation. When the counted period exceeds the preset initial value (thermal storage operation interruption period), the thermal storage operation is restarted, and simultaneously the counting means counts the thermal storage operation period. When the pipe temperature has achieved the preset initial value, the thermal storage operation is stopped, and simultaneously the counting means stops counting the thermal storage operation period. If the counted thermal storage operation period is shorter than the preset value, the next thermal storage operation interruption period is lengthened. Conversely, if the counted thermal storage operation period is longer, the next thermal storage operation interruption period is shortened.

As explained, the air conditioning system of the fourth embodiment can timely start and stop the thermal storage operation at all times to maintain the thermal storage state in a sufficient manner, allowing the stored heat to be utilized for blowing off conditioned hot air at once at the heating kickoff operation.

The arrangement of the air conditioning system according to the fourth embodiment wherein the thermal storage operation is stopped based on the pipe temperature at the thermal storage side of the thermal storage and radiating heat exchanger, and the timing of restarting the next thermal storage operation is determined depending on the length of the previous thermal storage operation period can offer advantages in that the thermal storage operation is carried out in a proper and effective manner, the thermal storage material in the thermal storage device is in the form of liquid at all times, i.e. the thermal storage material is kept under the thermal storage state, and the stored heat is utilized to blow off conditioned hot air at the time of the next heating operation.

What is claimed is:

1. An air conditioning system comprising:
  a refrigerant circuit;
  a thermal storage device which is arranged in the refrigerant circuit, and which can store heat and utilize the stored heat to increase heating capacity at the time of kickoff of heating;
  temperature detecting means for detecting a temperature at a thermal storage portion of a thermal storage and radiating heat exchanger which is housed in the thermal storage device;
  means for counting a thermal storage operation period required for the temperature, detected at the thermal storage portion, to achieve a predetermined value, for outputting a signal indicative of stopping a thermal storage operation when the detected temperature has achieved the predetermined value, for counting the lapse of a predetermined thermal storage operation stoppage period after stop of the thermal storage operation, and for outputting a signal indicative of starting the thermal storage operation when a predetermined thermal storage operation stoppage time has passed; and
  control means for comparing the counted thermal storage operation period with a preset value, and determining the next thermal storage operation stoppage period, depending on length of the counted thermal storage operation period.

2. An air conditioning system according to claim 1, wherein the temperature detected at the thermal storage portion is a pipe temperature at a thermal storage side of the thermal storage and radiating releasing heat exchanger.

3. An air conditioning system according to claim 1, wherein the preset value is changed, depending on an operating condition.

4. An air conditioning system according to claim 3, wherein the operating condition is an outdoor air temperature.

5. An air conditioning system according to claim 3, wherein the operating condition is a driving condition of the compressor.

* * * * *